US012209724B2

(12) United States Patent
Wu et al.

(10) Patent No.: US 12,209,724 B2
(45) Date of Patent: Jan. 28, 2025

(54) OUTER LENS, CORRESPONDING VEHICLE LAMP, VEHICLE, AND METHOD

(71) Applicant: VALEO VISION, Bobigny (FR)

(72) Inventors: Changqi Wu, Wuhan (CN); Xihui Mo, Wuhan (CN); Haiquan Chen, Wuhan (CN); Weifang Huang, Wuhan (CN); Yinfeng Cheng, Wuhan (CN); Frederic Hayez, Wuhan (CN); Alexandre Franc, Wuhan (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/910,562

(22) PCT Filed: Mar. 11, 2021

(86) PCT No.: PCT/CN2021/080189
§ 371 (c)(1),
(2) Date: Sep. 9, 2022

(87) PCT Pub. No.: WO2021/180168
PCT Pub. Date: Sep. 16, 2021

(65) Prior Publication Data

US 2023/0134384 A1 May 4, 2023

(30) Foreign Application Priority Data

Mar. 11, 2020 (CN) ......................... 202010165499.7
Mar. 11, 2020 (CN) ......................... 202010169904.2
Mar. 11, 2020 (CN) ......................... 202010169905.7

(51) Int. Cl.
*F21S 41/24* (2018.01)
*F21S 41/37* (2018.01)

(52) U.S. Cl.
CPC ............... *F21S 41/24* (2018.01); *F21S 41/37* (2018.01)

(58) Field of Classification Search
CPC ........ F21S 41/24; F21S 43/239; F21S 43/245; F21S 43/247
See application file for complete search history.

(56) References Cited

U.S. PATENT DOCUMENTS 9,630,551 B2 4/2017 Verrat-Debailleul et al.
10,168,039 B2 1/2019 Dellock et al.
(Continued)

FOREIGN PATENT DOCUMENTS

CN 204488636 U 7/2015
CN 106427819 A 2/2017
(Continued)

OTHER PUBLICATIONS

China National Intellectual Propertyy Administration (ISA/CN), International Search Report (with English translation) and Written Opinion of corresponding International Application No. PCT/CN2021/080189, dated Jun. 8, 2021.
(Continued)

*Primary Examiner* — Sean P Gramling
(74) *Attorney, Agent, or Firm* — Valeo Vision

(57) ABSTRACT

A problem to be solved by an embodiment of the present application is how to make the structure of a vehicle lamp more compact. According to an embodiment of the present application, an outer lens is provided, wherein the outer lens comprises: a first lens portion; and a reflecting portion, the reflecting portion being disposed on at least one side of the first lens portion, in close contact with the first lens portion, and capable of reflecting a light beam entering the first lens portion so that the light beam is propagated inside the first lens portion. Compared with the prior art, the present application has the following advantages: the structure of the outer lens is more compact, the overall volume of the vehicle lamp is smaller, and the light output is more uniform.

20 Claims, 3 Drawing Sheets

(56) References Cited

U.S. PATENT DOCUMENTS

| | | | | |
|---|---|---|---|---|
| 10,293,761 | B2 | 5/2019 | Topart et al. | |
| 2009/0128735 | A1 * | 5/2009 | Larson ................. | G02B 6/0018 362/244 |
| 2016/0170120 | A1 * | 6/2016 | Shani ................ | G02F 1/133614 362/607 |
| 2017/0111045 | A1 | 4/2017 | Lisseman et al. | |
| 2019/0249842 | A1 | 8/2019 | Shi et al. | |
| 2021/0009030 | A1 * | 1/2021 | Ho ......................... | G02B 6/006 |

FOREIGN PATENT DOCUMENTS

| | | | |
|---|---|---|---|
| CN | 208027046 | U | 10/2018 |
| CN | 109383410 | A | 2/2019 |
| CN | 208457847 | U | 2/2019 |
| CN | 208585195 | U | 5/2019 |
| CN | 208886659 | U | 5/2019 |
| CN | 211976803 | U | 11/2020 |
| CN | 212005561 | U | 11/2020 |
| CN | 212005562 | U | 11/2020 |
| JP | 200791085 | A | 4/2007 |
| JP | 2012507136 | A | 3/2012 |
| JP | 2013205530 | A | 10/2013 |
| JP | 2015503186 | A | 1/2015 |
| JP | 5951391 | B2 | 7/2016 |
| JP | 2017074818 | A | 4/2017 |
| WO | 2018178591 | A1 | 10/2018 |

OTHER PUBLICATIONS

Japan Patent Office, Office Action (with English translation) of corresponding Japanese Patent Application No. 2022-554720, dated Aug. 22, 2023.

* cited by examiner

OUTER LENS, CORRESPONDING VEHICLE LAMP, VEHICLE, AND METHOD

CROSS-REFERENCE TO RELATED APPLICATIONS

This application is filed under 35 U.S.C. § 371 U.S. National Phase of International Application No. PCT/CN2021/080189 filed Mar. 11, 2020 (published as WO2021180168), which claims priority benefit to Chinese Application Nos. 202010165499.7; 202010169904.2; and 202010169905.7 filed on Mar. 11, 2020, the disclosures of which are herein incorporated by reference in their entirety.

TECHNICAL FIELD

The present application relates to the field of optical technology, and in particular, to an outer lens, a corresponding vehicle lamp, a vehicle, and a method.

BACKGROUND OF THE INVENTION

In the prior art in the field of vehicle lamps, the outer lens is usually only used to perform the light emission function, which means that a light beam is processed mainly by the inner lens portion and is directly emitted upon reaching the outer lens. However, an inner lens required in this case is often large, and consequently the vehicle lamp has a large overall volume.

BRIEF SUMMARY OF THE INVENTION

In view of this background, one problem to be solved by an embodiment of the present application is how to make the overall volume of a vehicle lamp smaller.

According to one aspect of the present application, an outer lens is provided, wherein the outer lens comprises:

a first lens portion; and a reflecting portion, the reflecting portion being disposed on at least one side of the first lens portion, in close contact with the first lens portion, and capable of reflecting a light beam entering the first lens portion so that the light beam is propagated inside the first lens portion.

While a conventional light guide relies on air for optical propagation, according to an embodiment of the present application, there is no air between the first lens portion and the reflecting portion, and a light beam is propagated inside the first lens portion relying on the reflection provided by the reflecting portion, which, different from how a conventional light guide operates, provides a new method of light propagation; in addition, since there may be no air layer inside the outer lens, the outer lens is more compact, occupying less space.

According to an embodiment of the present application, the reflecting portion comprises an intermediate film disposed on one side of the first lens portion, the intermediate film comprising an intermediate reflecting layer, the intermediate reflecting layer being capable of reflecting a light beam entering the first lens portion so that the light beam is propagated inside the first lens portion.

According to an embodiment of the present application, the intermediate film is realized by using an IML film.

By the use of an IML film, the outer lens may be caused to present a variety of desired patterns and styles.

According to an embodiment of the present application, the intermediate film further comprises at least one of the following coatings:

an intermediate light-shielding layer;

an intermediate protective layer;

a bonding layer.

By means of an intermediate light-shielding layer, a light beam being propagated in the first lens portion may be prevented from leaking from the side of the intermediate reflecting layer; by means of an intermediate protective layer, the intermediate film may be protected; by means of a bonding layer, the intermediate film may be bonded to another component; by means of a light-homogenizing layer, emitted light becomes more uniform as a whole.

According to an embodiment of the present application, the intermediate film may be formed into a desired pattern.

According to an embodiment of the present application, the reflecting portion further comprises a first reflecting layer disposed on one side of the first lens portion opposite to the side on which the intermediate film is located, the first reflecting layer being capable of reflecting a light beam entering the first lens portion so that the light beam is propagated inside the first lens portion.

By using a structure that allows reflection on both sides, the efficiency of light beam propagation inside the outer lens may be further improved, and loss of light energy may be reduced.

According to an embodiment of the present application, the intermediate reflecting layer and/or the first reflecting layer comprises at least one reflection treatment area, the reflection treatment area being an area in which the reflecting layer is subjected to reflection reduction or reflection enhancement treatment. For an over-bright area, reducing reflection through the reflection treatment area can reduce outgoing light in the over-bright area and decrease the brightness of the outgoing light; similarly, for an over-dim area, increasing the reflection through the reflection treatment area can increase the outgoing light in the over-dim area and increase the brightness of the outgoing light. Thus, formation of an over-bright/over-dim area may be effectively avoided so that the overall light output is more uniform, and since reflection treatment is performed only on part of the area, the process is simpler and a higher efficiency is achieved.

According to an embodiment of the present application, reflection reduction treatment comprises:

adding colored dots on the intermediate reflecting layer and/or the first reflecting layer; and/or using an optical structure capable of reducing reflection on the intermediate reflecting layer and/or the first reflecting layer.

According to an embodiment of the present application, the reflection enhancement treatment comprises:

applying an aluminum coating on the intermediate reflecting layer and/or the first reflecting layer.

According to an embodiment of the present application, the outer lens further comprises at least one light inlet and at least one intermediate light outlet, wherein the at least one intermediate light outlet is disposed on the side of the first lens portion with the reflecting portion, and a light beam passes through the at least one light inlet to enter the first lens portion and is propagated inside the first lens portion, thereby reaching the at least one intermediate light outlet.

The light inlet and the intermediate light outlet may be located far apart, thus allowing greater freedom of choice about the position of a light source. In addition, after being transmitted several times in the outer lens, the ultimate light output will be more uniform.

According to an embodiment of the present application, the reflecting portion located on the same side as the at least one intermediate light outlet is realized by using an intermediate film, wherein the intermediate light outlet is formed by a partial structure of the intermediate film or hollowing out the intermediate film.

According to an embodiment of the present application, the intermediate film is realized by using an IML film.

By using an IML film, the outer lens may be caused to present a variety of desired patterns and styles, and since greater freedom of choice is allowed in the position of a light source, the outer lens can present more diverse patterns and styles.

According to an embodiment of the present application, the at least one light inlet is disposed on a side of the first lens portion opposite to the side on which the at least one intermediate light outlet is located.

According to an embodiment of the present application, a light beam from one light inlet can reach one or more intermediate light outlets.

A light beam from one light inlet can reach one or more intermediate light outlets at different positions, which allows one light source to cover more areas.

According to an embodiment of the present application, at least part of a light beam from one light inlet can reach one intermediate light outlet after being reflected at least once.

The light beam reaches an intermediate light outlet after being reflected a plurality of times, which expands the area that the light beam can light up.

According to an embodiment of the present application, the outer lens further comprises a second lens portion, the intermediate film is located between the first lens portion and the second lens portion, and the at least one intermediate light outlet allows a light beam from the first lens portion to enter the second lens portion.

According to an embodiment of the present application, the first lens portion, the intermediate film, and the second lens portion are tightly bound together.

According to an embodiment of the present application, the first lens portion, the intermediate film, and the second lens portion are an integral component.

The structure of the outer lens may be made more compact by binding the first lens portion, the intermediate film, and the second lens portion tightly together.

According to another aspect of the present application, a vehicle lamp is provided, wherein the vehicle lamp comprises any of the outer lenses described above, and at least one light source corresponding to the outer lens.

According to an embodiment of the present application, the vehicle lamp further comprises at least one inner lens; the inner lens is used to guide a light beam from a light source to the light inlet of the outer lens to enter the first lens portion.

Since the inner lens is required only between the light source and the light inlet of the outer lens, the required volume of the inner lens is greatly reduced, and thus the overall volume of the vehicle lamp is reduced.

According to an embodiment of the present application, the vehicle lamp is a vehicle logo lamp.

According to another aspect of the present application, a vehicle is provided, the vehicle comprising any of the vehicle lamps described above.

According to another aspect of the present application, a method for manufacturing an outer lens is provided, wherein the method comprises the following steps:

- making an intermediate film by pressing, the intermediate film comprising at least an intermediate reflecting layer;
- obtaining a first lens portion by injection molding on one side of the intermediate film, wherein the intermediate film acts as a reflecting portion to reflect a light beam entering the first lens portion so that the light beam is propagated inside the first lens portion.

According to an embodiment of the present application, making an intermediate film by pressing further comprises forming at least one intermediate light outlet in the intermediate film, and the method further comprises the following step:

- obtaining a second lens portion by injection molding on the other side of the intermediate film.

According to an embodiment of the present application, the method further comprises the following step:

- adding a first reflecting layer on the other side of the first lens portion.

According to an embodiment of the present application, the method further comprises the following step:

- subjecting at least a part of the intermediate reflecting layer and/or the first reflecting layer to reflection reduction treatment or reflection enhancement treatment.

According to an embodiment of the present application, reflection reduction treatment comprises:

- adding colored dots in a partial area of the intermediate reflecting layer and/or the first reflecting layer; or
- using an optical structure capable of reducing reflection in a partial area of the intermediate reflecting layer and/or the first reflecting layer.

According to an embodiment of the present application, the reflection enhancement treatment comprises:

- applying an aluminum coating on a partial area of the intermediate reflecting layer and/or the first reflecting layer.

Compared with the prior art, the present application has the following advantages: the structure of the outer lens is more compact, the overall volume of the vehicle lamp is smaller, and the light output is more uniform.

BRIEF DESCRIPTION OF THE DRAWINGS

Other features, objects and advantages of the present application will become more obvious through perusal of a detailed description of non-limiting embodiments which makes reference to the accompanying drawings below.

Figure 1:
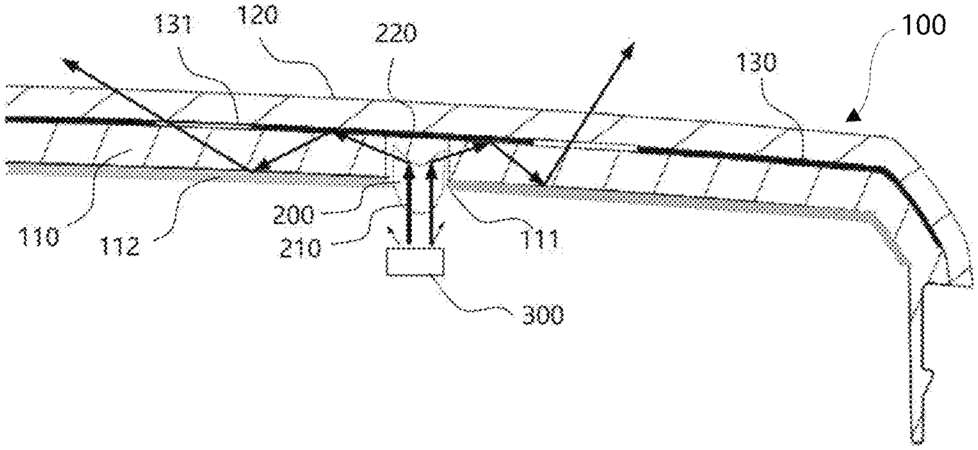
FIG. 1 is a schematic structural diagram of a part of a vehicle lamp according to a preferred embodiment of the present application.

the reference numerals are as follows:

| | | | |
|---|---|---|---|
| 100 | Outer lens | 200 | Inner lens |
| 300 | Light source | 110 | First lens portion |
| 120 | Second lens portion | 130 | Intermediate film |
| 111 | Light inlet | 112 | First reflecting layer |
| 113 | Reflection treatment area | 131 | Intermediate light outlet |
| 114 | First light-shielding layer | 121 | Outer protective layer |
| 1301 | Intermediate reflecting layer | 1302 | Intermediate light-shielding layer |
| 1304 | Bonding layer | 1305 | Light-homogenizing layer |
| 1306 | Substrate layer | 210 | Light entry portion |
| 220 | Guide portion | | |

DETAILED DESCRIPTION OF THE INVENTION

Preferred embodiments of the present application will be described in more detail below with reference to the accompanying drawings. Although preferred embodiments of the present application are shown in the drawings, it should be understood that the present application may be realized in various forms, and should not be restricted by the embodiments expounded here. Rather, these embodiments are provided so that this application will be more thorough and complete, and will fully convey the scope of this application to those skilled in the art.

An embodiment according to the present application discloses an outer lens 100, a vehicle lamp using the outer lens 100, and a vehicle comprising the vehicle lamp.

A light beam can finally be outputted by the outer lens. For example, when the present application is used for a vehicle lamp, a light beam passes through the outer lens and eventually exits from the vehicle lamp.

Refer to FIG. 1 to FIG. 4.

According to an embodiment of the present application, the outer lens 100 comprises a first lens portion 110, a reflecting portion being disposed on at least one side of the first lens portion 110, in close contact with the first lens portion 110, and capable of reflecting a light beam entering the first lens portion 110 so that the light beam is propagated without air in the first lens portion 110.

Specifically, after entering the first lens portion 110, a light beam is reflected and propagated by the reflecting portion on at least one side, so that the light beam is diffused and propagated in the first lens portion 110, that is, being propagated in the outer lens in 100, without passing through a medium, for example, a light guide or air.

According to a preferred solution of this embodiment, the outer lens 100 further comprises an intermediate film 130, the intermediate film 130 being used for realizing the reflecting portion on the side of the first lens portion 110.

It should be noted that the inner side surface of the first lens portion 110 may be uneven.

Preferably, the intermediate film 130 comprises at least an intermediate reflecting layer 1301, the intermediate reflecting layer 1301 being bonded to the first lens portion 110.

More preferably, the intermediate film 130 may further comprise at least any one of the following coatings:

1) An intermediate light-shielding layer 1302; preferably, the intermediate light-shielding layer 1302 is located behind the intermediate reflecting layer 1301 to prevent the beam propagated in the first lens portion 110 from leaking from the side of the intermediate reflecting layer 1301. (Terms "front" and "rear" mentioned in this description are used with the direction in which a light beam exits from the light source as a point of reference, wherein being close to the light source is "front", while being far away from the light source is "rear".)
2) An intermediate protective layer; it is used to protect the intermediate film 130;
3) A bonding layer 1304; it is used for bonding the intermediate film 130 to another component.

More preferably, one or more of the above-described coatings may be implemented by the same layer.

For example, a coating can perform the protective and bonding functions at the same time, which means that it can function as a protective layer and a bonding layer at the same time.

According to a preferred embodiment of the present application, the reflecting portion on the other side of the first lens portion 110 according to this embodiment is realized by a first reflecting layer 112.

More preferably, the reflecting portion on the other side may further comprise a first light-shielding layer 114 to reduce the leakage of a light beam propagated in the first lens portion 110 from the first reflecting layer 112 side.

According to a preferred embodiment of the present application, the first lens portion 110 has at least one light inlet 111, the light inlet 111 being a concave structure.

According to another preferred embodiment of the present application, the light inlet 111 may be a protruding structure (not shown in a figure) or the like on the first lens portion 110.

It is readily comprehensible to those of ordinary skill in the art that the above-described examples are only intended to explain the light inlet 111 for ease of understanding, rather than being intended to limit the claims. Any structure capable of realizing entry of light beams may constitute the light inlet 111 described in the present application.

Specifically, the light inlet 111 of the first lens portion 110 is used to accommodate at least part of the inner lens 200 so that a light beam emitted by the inner lens 200 enters the first lens portion 110.

According to yet another preferred embodiment of the present application, the outer lens 100 further comprises a second lens portion 120, wherein the intermediate film 130 is located between the first lens portion 110 and the second lens portion 120, and the intermediate film 130 is provided with an intermediate light outlet 131, so that a light beam from the first lens portion 110 enters the second lens portion 120 and exits through the second lens portion 120.

More preferably, the rear of the second lens portion 120 further comprises an outer protective layer 121.

The outer protective layer 121 is used to protect the second lens portion 120. For example, it protects the second lens portion 120 from environmental influences (such as ultraviolet rays, high temperature and high humidity), and may also prevent the lens from coming into direct contact with anther component and being scratched.

According to a preferred embodiment of the present application, the intermediate film 130 may comprise an intermediate light outlet 131.

Figure 3:
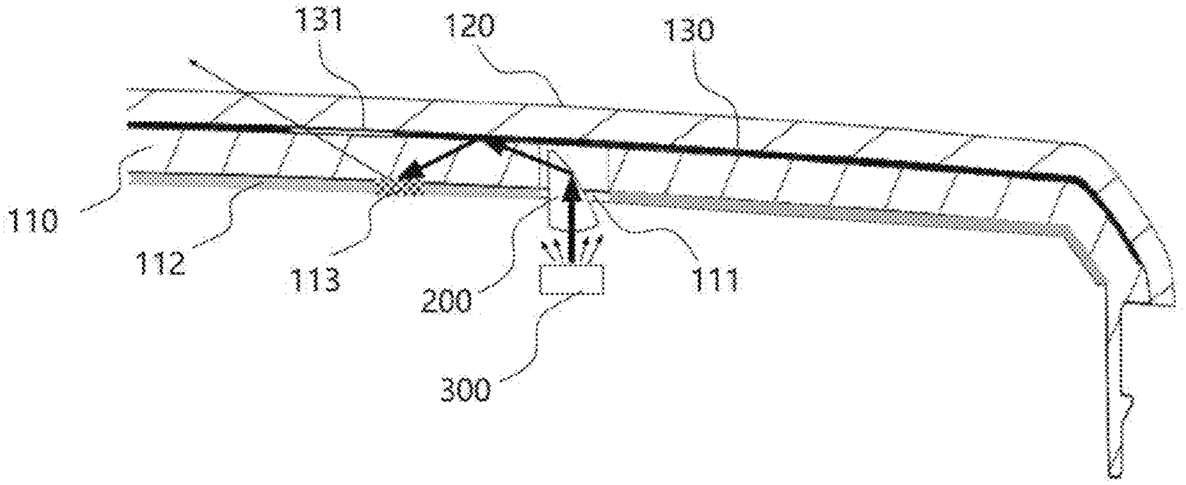
FIG. 3 is a schematic structural diagram of a vehicle lamp according to still another embodiment of the present application.
Figure 4:
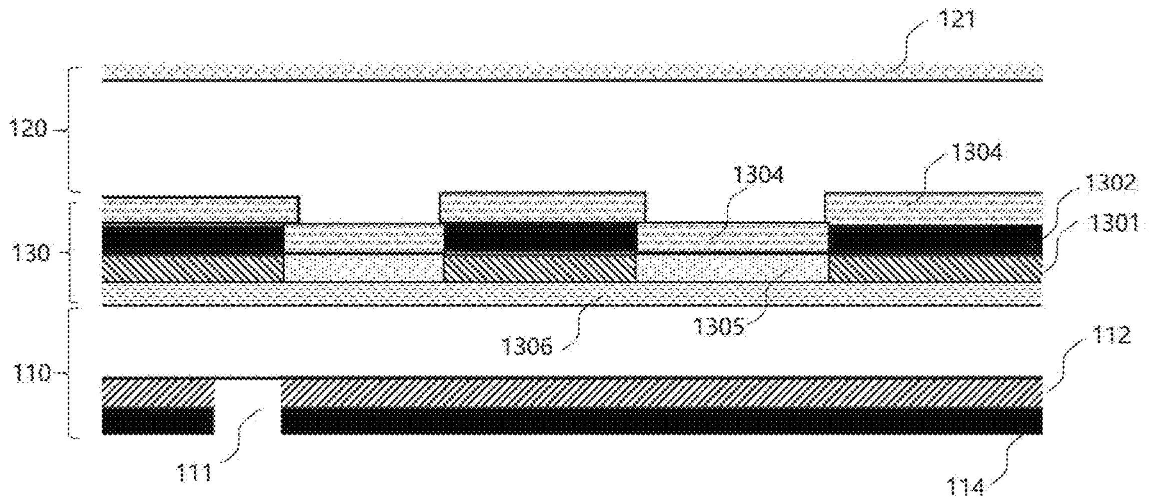
FIG. 4 is a schematic diagram of layers of an outer lens according to a preferred embodiment of the present application.

Specifically, the intermediate light outlet 131 may be realized by:

1) hollowing out the intermediate film 130; in other words, a light beam emitted from the first lens portion 110 exits by passing through a gap of the intermediate film 130; or by
2) a light-homogenizing layer 1305 in the intermediate film 130. Specifically, referring to FIG. 3, the light-homogenizing layer 1305 shown in FIG. 3 is spaced in coatings including the intermediate reflecting layer 1301, so that a light beam emitted from the first lens portion 110 is homogenized and then exits.

According to a preferred solution of this embodiment, the first lens portion 110 may have a convex or concave structure matching the intermediate light outlet 131 of the intermediate film 130.

For example, when the intermediate film 130 adopts a hollowed-out gap to realize the intermediate light outlet 131, the first lens portion 110 may have a slightly convex structure at the corresponding part of the gap to fill the gap; another example is that when the intermediate film 130 adopts the light-homogenizing layer 1305, the first lens portion may have a slightly concave structure in the light-homogenizing layer portion, so that the light-homogenizing layer 1305 has a sufficient thickness, etc.

Preferably, the intermediate film 130 can form desired patterns, such as characters and images.

For example, the light-shielding portion of the intermediate film 130 is formed by the intermediate reflecting layer 1301, the intermediate light-shielding layer 1302, and the protective layer 1304, and the light-shielding portion, as a whole, forms the word "MOTOR", the inter-character gaps being realized by the light-homogenizing layer 1305.

More preferably, the intermediate film may be realized by using an Inner Molding Label (IML) film.

Preferably, when an IML film is used to realize the intermediate film, it further has a substrate layer 1306, and each of the aforementioned layers may be located on the substrate layer 1306.

According to a preferred embodiment of the present application, a side surface of the first lens layer 110 may at least partially have a micro-concave-convex structure, the micro-concave-convex structure being capable of exhibiting a regular or irregular distribution.

Specifically, both side surfaces of the first lens layer 110 may be smooth surfaces or non-smooth surfaces.

Preferably, a partial area of at least one side surface of the first lens layer 110 comprises a micro-concave-convex structure (not shown in a figure). The micro-concave-convex structure may be one or more of structures such as prism structure, serrated structure, and pillow-shaped structure.

The first lens portion 110, the intermediate film 130, and the second lens portion 120 are tightly bound together, which means that there is no air in the outer lens 100.

More preferably, the first lens portion 110, the intermediate film 130, and the second lens portion 120 may be an integral component.

According to a solution provided by the present embodiment, a light beam may be propagated without air in the outer lens of the solution, and gaps between components are reduced, so that the outer lens is more compact as a whole.

According to yet another embodiment of the present application, the outer lens 100 has at least one light inlet 111 and at least one intermediate light outlet 131, wherein the light beam, after entering the outer lens 100 through the at least one light inlet 111, is propagated inside the outer lens 100 to reach the at least one intermediate light outlet.

Specifically, the outer lens 100 according to the present embodiment comprises a first lens portion 110, the first lens portion 110 having a reflecting portion on at least one side so that a light beam may be propagated inside the first lens portion. For the implementation of the first lens portion 110 and the reflecting portion on at least one side, reference may be made to the foregoing description, which will not be provided again herein.

The light inlet 111 is located on one side of the first lens portion 110, and the intermediate light outlet 131 is located on the other side of the first lens portion 110.

The intermediate light outlet 131 may be realized by the intermediate film 130, or may be realized by a combination of the intermediate film 130 and the first lens portion 110. For details, reference may be made to the foregoing description, which will not be provided again herein.

According to a preferred solution of this embodiment, a light beam from one light inlet 111 can reach one or more of the intermediate light outlets 131.

According to a preferred solution of this embodiment, at least part of a light beam from one light inlet 111 can reach one intermediate light outlet 131 after being reflected at least once.

According to a preferred solution of this embodiment, the outer lens 100 further comprises a second lens portion 120, wherein the second lens portion 120 is located on one side of the intermediate light outlet 131, and a light beam may, through the intermediate light outlet 131, be emitted from the first lens portion 110 to the second lens portion 120, and exits from the outer lens 100.

Figure 2:
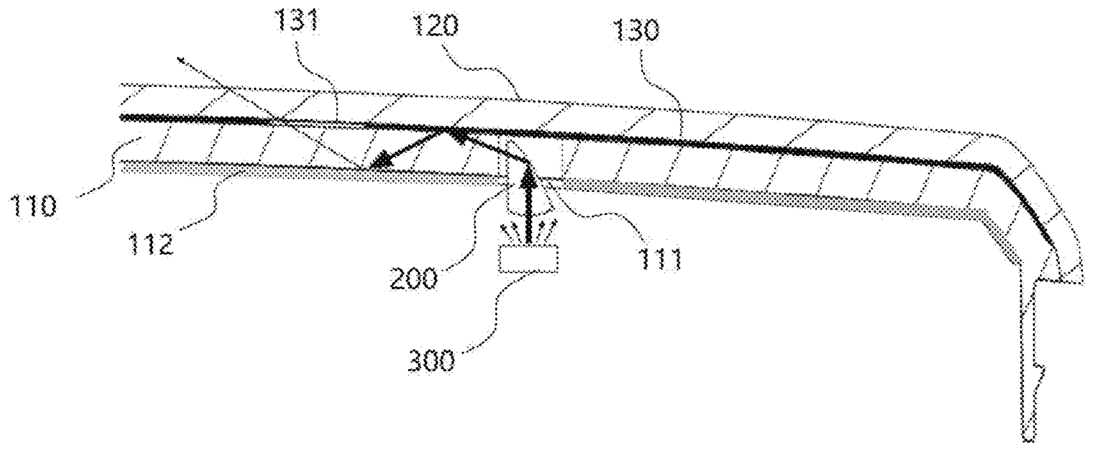
FIG. 2 is a schematic structural diagram of a vehicle lamp according to still another embodiment of the present application.

According to yet another embodiment of the present application, refer to FIG. 1 or FIG. 2. The outer lens 100 shown in FIG. 1 or FIG. 2 comprises a first lens portion 110, a second lens portion 120, and an intermediate film 130.

The intermediate film 130 is located between the first lens portion 110 and the second lens portion 120, and the intermediate film 130 comprises at least one intermediate light outlet 131, the intermediate light outlet 131 allowing a light beam to enter the second lens portion 120 from the first lens portion 110; in addition, the first lens portion 110 comprises at least one light inlet 111 and a first reflecting layer 120 located on the side opposite to the intermediate film 130.

Specifically, after entering the first lens portion 110 from the light inlet 111, a light beam may be reflected one or more times by the reflection function of the first reflecting layer 111 and/or the intermediate reflecting layer 1301 of the intermediate film 130, that is, being propagated inside the first lens portion 110.

It is readily comprehensible to those of ordinary skill in the art that the first reflecting layer 112 and the intermediate reflecting layer 1301 according to this solution may be made of the same or different materials, for example, polycarbonate (PC) reflective film and aluminum layer, as long as they are reflective.

According to a preferred embodiment of the present application, referring to FIG. 3, wherein the intermediate reflecting layer 1301 and/or the first reflecting layer 112 comprises at least one reflection treatment area 113, the reflection treatment area 113 being an area in which the reflecting layer is subjected to reflection reduction or reflection enhancement treatment.

It should be noted that the reflection treatment area 113 means that this area becomes less/more reflective after being subjected to the treatment, rather than becoming less/more reflective compared with another area.

Specifically, the reflection reduction treatment comprises, but is not limited to, at least any of the following:

1) adding colored dots in at least one area of the intermediate reflecting layer 1301 and/or the first reflecting layer 112; more preferably, the reflection reduction treatment comprises adding an area of black dots in at least one area of the intermediate reflecting layer 1301 and/or the first reflecting layer 112; or 2) adopting an optical structure capable of reducing reflection on at least one area of the intermediate reflecting layer 1301 and/or the first reflecting layer 112; for example, the structure may be a slope, a serrated face, etc. capable of reducing light beams exiting from the outlet.

Specifically, the reflection enhancement treatment comprises, but is not limited to, applying an aluminum coating on at least one area of the intermediate reflecting layer 1301 and/or the first reflecting layer 112.

It is readily comprehensible to those of ordinary skill in the art that the reflection treatment according to the present application comprises, but is not limited to, the treatment methods mentioned above, and that reflection reduction treatment may also be achieved by adding a layer of film capable of partially absorbing light beams in a part of the reflecting layer, for example. The examples given herein are intended to explain, rather than limiting, the claims.

A vehicle lamp according to the present application comprises an outer lens 100 and at least one light source 300 corresponding to the outer lens 100.

Preferably, the outer lens 100 comprises at least one light inlet 111, and the at least one light source 300 corresponds to the at least one light inlet 111 respectively.

More preferably, the vehicle lamp further comprises at least one inner lens 200; the inner lens 200 is used to guide a light beam from the light source 300 to the light inlet 111 of the outer lens 100 so that the light beam enters the outer lens 100.

Specifically, the inner lens 200 comprises a light entry portion 210 and a guide portion 220. The light entry portion 210 is used to receive a light beam from the light source 300, and preferably, the light entry portion 210 may have a shape suitable for condensing light, for example, an arc shape.

The guide portion 220 is used to guide a light beam to a direction corresponding to the light inlet 111 of the outer lens 100. The guide portion 220 may be implemented with a variety of structures, wherein, for example, the guide portion 220 of the inner lens 200 shown in FIG. 1 has an arc-shaped surface so that incident light, after entering the inner lens 200, is reflected by the arc-shaped surface to enter the outer lens 100.

According to a preferred solution of this embodiment, the guide portion 220 of the inner lens 200 may also adopt a structure capable of changing the light path, such as a reflective surface and a prism, to guide a light beam.

Preferably, the vehicle lamp may be a vehicle logo lamp, and the vehicle logo lamp comprises a lamp that forms a logo corresponding to a vehicle, such as a pattern or character.

Preferably, a vehicle logo according to the present application is formed using the intermediate film 130 in the outer lens 100.

A method for manufacturing the outer lens 100 according to the present application comprises step S1, step S2 and step S3.

In step S1, an intermediate film 130 is made by pressing; the intermediate film comprises at least one intermediate reflecting layer 1301.

The intermediate film 130 comprises at least one intermediate light outlet 131;

for the structure of the intermediate film 130, reference may be made to the foregoing description, which will not be provided again herein.

The intermediate film may be made by pressing in different manners, and when an IML film is used, it may be realized by the corresponding injection molding process for in-film inserts.

It is readily comprehensible to those of ordinary skill in the art that the shape of the intermediate film and the pattern formed by the light-shielding portion thereof are determinable according to actual requirements and situations, rather than being limited to the circumstances described in the examples.

Next, in step S2, injection molding is performed on one side of the intermediate film 130 to obtain the first lens portion 110.

Preferably, the method according to the present application further comprises step S2'.

In step S2', injection molding is performed on the other side of the intermediate film 130 to obtain the second lens portion 120.

It is readily comprehensible to those of ordinary skill in the art that the sequence of injection molding on the first lens portion and the second lens portion does not affect the final product, which means that in the process of producing an outer lens comprising a second lens portion, step S2 may be performed first and then step ST is performed, or step ST may be performed first and then step S2 is performed. Moreover, specific structures of the first lens portion 110 and the second lens portion 120 are determinable according to actual conditions and requirements.

Preferably, the method according to this embodiment further comprises step S3.

In step S3, a first reflecting layer 112 is added on the first lens portion 110.

More preferably, the method according to this embodiment further comprises the step of adding a light-shielding layer on the first reflecting layer 112.

According to a preferred embodiment of the solution, the method further comprises step S4.

In step S4, a reflection reduction treatment or reflection enhancement treatment is performed on at least a partial area of the intermediate reflecting layer and/or the first reflecting layer.

Preferably, after one or more outer lenses 100 are obtained, one or more light outlets whose brightness is higher or lower than that of other areas are determined on the basis of light output detection of the obtained outer lenses 100, and part or all of the areas of the intermediate reflecting layer and/or the first reflecting layer that can reflect light beams to the light outlet are selected as areas to be treated, which need to be subjected to reflection reduction treatment or reflection enhancement treatment.

Then, the determined areas to be treated of the intermediate reflecting layer and/or the first reflecting layer are subjected to reflection reduction treatment or reflection enhancement treatment, respectively.

More preferably, reflection reduction treatment may be performed on some areas, while reflection enhancement treatment may be performed on other areas.

It is readily comprehensible to those of ordinary skill in the art that, in this case, the areas to be treated need to be divided into areas to be subjected to reflection enhancement treatment and areas to be subjected to reflection reduction treatment.

More preferably, it is possible to perform light output detection on only part of the outer lenses and determine the areas to be treated, and subject the corresponding areas of all the outer lenses to reflection enhancement treatment or reflection reduction treatment.

Specific methods of reflection enhancement treatment or reflection reduction treatment have been explained in the foregoing description, and will not be detailed again herein.

With an optical structure of the present application, the design of the first outer lens allows a significant reduction in the overall thickness of the optical structure to meet more stringent thickness requirements. While the appearance requirements are met, light exit quality is guaranteed and light exit efficiency improved.

It will be apparent to those skilled in the art that the present application is not limited to the details of the above-described exemplary embodiments, and may be implemented in other specific forms without departing from the spirit or essential characteristics of the present application. Thus, regardless of which viewpoint is taken, the embodiments should be regarded as being demonstrative and non-limiting; the scope of the present application is defined by the attached claims and not by the explanation above, hence it is intended that all changes falling within the meaning and scope of equivalent key elements of the claims be included in the present application. No reference signs in the claims should be regarded as limiting the claims concerned. In addition, it is obvious that the word "comprises" does not exclude other units or steps, and the singular does not exclude the plural. Multiple units or apparatuses presented in system claims may also be realized by one unit or apparatus by means of software or hardware. Words such as first and second are used to indicate designations, and do not indicate any specific order.

What is claimed is:

1. An outer lens, comprising:

a first lens portion with at least one light inlet;

an intermediate film disposed on a first side of the first lens portion, wherein the intermediate film is made from a number of layers including a substrate, a plurality of light-reflective, light-shielding, light-homogenizing and bonding layers;

a second lens portion overlaying the intermediate film; and a light shielding layer disposed on a second side of the first lens portion, which is configured to reflect a light beam entering the first lens portion through the at least one light inlet so that the light beam is propagated inside the first lens portion, where the light beam entering the first lens portion is configured to be substantially perpendicular to a direction of beam propagation through an inner lens positioned in the at least one light inlet.

2. The outer lens of claim 1, wherein the first lens portion is overlaid by the intermediate film disposed on the first side of the first lens portion, an intermediate reflecting layer adapted to reflect the light beam entering the first lens portion such that the light beam propagates through the substrate and inside the intermediate film.

3. The outer lens as claimed in claim 2, wherein the intermediate film is an IML film.

4. The outer lens of claim 2, wherein the intermediate film includes an intermediate shield layer.

5. The outer lens of claim 2, wherein the intermediate film is configured to be formed into a pattern.

6. The outer lens of claim 2, wherein the first lens portion further includes a first reflecting layer disposed opposite to the side on which the intermediate film is located.

7. The outer lens of claim 6, wherein the intermediate reflecting layer or the first reflecting layer includes at least one reflection treatment area, the reflection treatment area being an area in which the first reflecting layer is subjected to reflection reduction or reflection enhancement treatment.

8. The outer lens of claim 7, wherein the reflection reduction treatment includes:

adding colored dots on the intermediate reflecting layer or the first reflecting layer; or using an optical structure capable of reducing reflection on the intermediate reflecting layer or the first reflecting layer.

9. The outer lens as claimed in claim 7, wherein the reflection enhancement treatment includes:

applying an aluminum coating on the intermediate reflecting layer or the first reflecting layer.

10. The outer lens of claim 1, further including at least one intermediate light outlet, with the at least one intermediate light outlet being disposed on an opposing side of the first lens portion with the first reflecting layer, where a light beam passes through the at least one light inlet to enter the first lens portion and is propagated inside the first lens portion, thereby reaching the at least one intermediate light outlet.

11. The outer lens of claim 10, wherein the intermediate light reflecting layer is located on the same side as the at least one intermediate light outlet through the intermediate film, wherein the intermediate light outlet is formed by a partial structure of the intermediate film or hollowing out the intermediate film.

12. The outer lens of claim 11, wherein the intermediate film is realized by using an IML film.

13. The outer lens of claim 10, wherein the at least one light inlet is disposed on the second side of the first lens portion opposite to a third side on which the at least one intermediate light outlet is located.

14. The outer lens as claimed in claim 13, wherein a light beam from one light inlet can reach one or more of the intermediate light outlets.

15. The outer lens as claimed in claim 14, wherein at least part of the light beam from one light inlet can reach one intermediate light outlet after being reflected at least once.

16. The outer lens as claimed in claim 1, further including where the intermediate film is located between the first lens portion and the second lens portion, and at least one intermediate light outlet allows a light beam from the first lens portion to enter the second lens portion.

17. The outer lens of claim 16, wherein the first lens portion, the intermediate film, and the second lens portion are all tightly bound together.

18. The outer lens as claimed in claim 17, wherein the first lens portion, the intermediate film, and the second lens portion are an integral component.

19. A vehicle lamp, comprising:

an outer lens including a first lens portion with at least one light inlet and a reflecting layer, with the reflecting layer being disposed on a first side of the first lens portion;

an intermediate film disposed along the first lens portion, wherein the intermediate film is made from a number of layers including a substrate, a plurality of light-reflective, light-shielding, light-homogenizing and bonding layers;

the reflecting layer in close contact with the first lens portion and capable of reflecting a light beam entering the first lens portion so that the light beam is propagated inside the first lens portion, with the light beam entering the first lens portion substantially perpendicular to the direction of the propagation;

an inner lens positioned at the at least one light inlet; and at least one light source corresponding to the inner lens.

20. A method for manufacturing an outer lens, the method comprising:

making an intermediate film through a pressing process, the intermediate film formed from a number of layers including a substrate, a plurality of light-reflective, light-shielding, light-homogenizing and bonding layers;

obtaining a first lens portion with at least one light inlet by injection molding on one side of the intermediate film, wherein the intermediate film provides reflecting portions to reflect a light beam entering the first lens portion so that the light beam propagates inside the first lens portion, such that the light beam entering the first lens portion is configured to be substantially perpendicular to a direction of beam propagation through an inner lens positioned in the at least one light inlet.

* * * * *